United States Patent [19]

Hamilton

[11] 4,238,573

[45] Dec. 9, 1980

[54] METHACRYLATE COATING COMPOSITIONS

[75] Inventor: Louis W. Hamilton, Cherry Hill, N.J.

[73] Assignee: E. I. Du Pont de Nemours and Company, Wilmington, Del.

[21] Appl. No.: 11,716

[22] Filed: Feb. 12, 1979

[51] Int. Cl.³ .............................................. C08L 63/00
[52] U.S. Cl. ................................... 525/110; 525/117; 525/118; 528/89; 260/42.28
[58] Field of Search ........................ 260/834; 528/89; 525/110, 117, 118

[56] References Cited

U.S. PATENT DOCUMENTS

| | | | |
|---|---|---|---|
| 2,686,771 | 8/1954 | Whitehill | 260/834 |
| 2,870,117 | 1/1959 | Vogel | 260/834 |
| 2,887,404 | 5/1959 | Evans . | |
| 2,940,943 | 6/1960 | Christenson | 260/834 |
| 2,978,437 | 4/1961 | Christenson | 260/834 |
| 3,011,993 | 12/1961 | Kapalko | 260/834 |
| 3,037,963 | 6/1962 | Christenson | 260/834 |
| 3,050,495 | 8/1962 | Christenson | 260/834 |
| 3,108,088 | 10/1963 | Krueger | 260/834 |
| 3,118,852 | 1/1964 | Christenson | 260/834 |
| 3,118,853 | 1/1964 | Hart | 260/834 |
| 3,163,623 | 12/1964 | Sekmakas | 260/834 |
| 3,300,439 | 1/1967 | Chloupek | 260/834 |
| 3,493,631 | 2/1970 | Christenson | 260/834 |
| 3,510,541 | 5/1970 | Kapalko | 260/834 |
| 3,551,517 | 12/1970 | Dowbenko | 260/834 |
| 3,943,187 | 3/1976 | Wu | 260/834 |
| 4,021,503 | 5/1977 | Goulding | 260/830 TW |
| 4,137,214 | 1/1979 | Kempter | 260/834 |

*Primary Examiner*—Paul Lieberman

[57] ABSTRACT

The curing temperature of an otherwise substantially conventional methacrylate coating composition is lowered and the weather resistance of the cured composition is improved by incorporating therein a phosphated and amine-neutralized epoxy resin.

15 Claims, No Drawings

METHACRYLATE COATING COMPOSITIONS

BACKGROUND OF THE INVENTION

1. Field of the Invention

This invention relates to improved coating compositions, e.g., paints and enamels, based on methacrylate interpolymers.

2. Prior Art

Evans U.S. Pat. No. 2,887,404 shows phosphated epoxy resins used as undercoatings for metals in contact with methyl methacrylate lacquer topcoatings.

Christenson U.S. Pat. No. 2,978,437 shows use of an ethylenically unsaturated carboxylic acid in the polymerization of an amide-containing acrylic interpolymer.

Kapalko et al. U.S. Pat. No. 3,011,993 shows acrylic polymers blended with polyethylene.

Christenson U.S. Pat. No. 3,037,963 shows amide-containing acrylic interpolymers modified by reaction with aldehydes or alkanol solutions of aldehydes.

Christenson U.S. Pat. No. 3,050,495 shows modified amide-containing acrylic interpolymers blended with amine or aminoplast resins such as melamine-formaldehyde and urea-formaldehyde resins.

Christenson U.S. Pat. No. 3,079,434 shows the preparation of modified amides which can be used in acrylic polymerization.

SUMMARY OF THE INVENTION

As indicated, for example, by the Christenson patents cited above, (meth)acrylate-containing polymers, acrylics, are well known in the art. In particular, they are useful for coating metals as in coil-coating processes for aluminum and the like in which the acrylic, generally pigmented, is spread continuously as a film over the metal and the product is continuously baked to cure the liquid film.

While presently used acrylic coating processes are quite good, improvements are desirable. The present invention effects a reduction in the baking temperature and subsequent increased weather-stability of the baked film by blending with an otherwise substantially conventional methacrylic polymer an epoxy resin phosphated and subsequently neutralized by means of an amine or ammonia.

DETAILS OF THE INVENTION

This invention is basically a liquid paint or enamel consisting of a solvent holding in suspension and/or solution components comprising (1) a substantially conventional methacrylate interpolymer, or copolymer, and (2) a phosphated and amine-neutralized epoxy resin. An aminoplast, or amine, resin is preferably blended with the interpolymer. Other ingredients will almost always be present in the paint as is well known in the art. The solvent will constitute about 15–60% by weight of the paint.

The acrylic resins upon which the present coating compositions are based are generally standard methyl methacrylate interpolymers or resins formed by methods well known in the art. These acrylic resins, which may or may not be compatible with water, comprise at least 35% and up to about 95% by weight of the binder in the liquid coating composition.

Preferred acrylic resins for use in the invention are methyl methacrylate interpolymers similar to those of the above-mentioned Christenson patents. Methyl methacrylate monomer should comprise about 5–40% by weight of the structure.

The interpolymer will contain, in addition to methyl methacrylate, one or more functionally-substituted (meth)acrylic monomers in which the function is carboxy, e.g., acrylic acid or itaconic acid; amido, acrylamide; N-hydroxymethylamido, e.g., N-methylol acrylamide; N-alkoxymethylacrylamido, e.g., isobutoxymethylacrylamide (see below); hydroxy, e.g., hydroxyethylacrylate; oxirane, e.g., glycidyl methacrylate; or amine, e.g., t-butylaminoethyl methacrylate. The functionally-substituted monomer will generally constitute 5–26% by weight of the interpolymer.

In the case of an amido functional group, at least about 50% of the amido groups may have a hydrogen atom replaced by the structure —$CH_2OR_1$ where $R_1$ is lower alkyl. Conversion of the amide to the N-alkoxymethyl derivative can be accomplished in at least two ways.

An alcohol-aldehyde can be added, usually in an organic solvent, to the reactant mixture during or after the interpolymerization and reacted with the amide group, e.g., formaldehyde in butanol (butyl Formcel; about 40 percent formaldehyde, 53 percent butanol, and 7 percent water) can be added to react with the amide group of acrylamide. When this procedure is employed, the contribution made by the alcohol-aldehyde will be noted separately in this specification, e.g., as n-butanol-formaldehyde, like another polymerizable monomer although it is recognized that such materials do not enter into the polymer backbone. The weight contribution of these mixtures will be regarded similarly.

Alternately, acrylamide or other polymerizable amide can be preliminarily reacted with alcohol-aldehyde to form a specific compound and the polymerizable product introduced into the interpolymerization as if it were any other polymerizable monomer. Thus, the monomer N-isobutoxymethylacrylamide can be employed directly in interpolymerization instead of acrylamide accompanied or preferably followed by formaldehyde in isobutanol.

In any case, the amide or amide plus alcohol-aldehyde may constitute about 5–26% by weight of the interpolymer.

In addition to the monomers mentioned, that is, methyl methacrylate and functionally substituted acrylic monomers, the interpolymer contains at least one other monomer having a $CH_2=C<$ group. This monomer can be any of those useful in acrylate interpolymers such as a (meth)acrylate, e.g., methyl acrylate, ethyl acrylate, ethyl methacrylate, butyl acrylate, or the like, or a vinyl compound such as styrene, methyl styrene, vinyl toluene, acrylonitrile or the like. Any number of different monomers can, of course, be used to modify the properties of the interpolymer.

The interpolymers of the various monomers can be easily prepared by methods customary in the formation of acrylic polymers. Details are readily available, for example, in the cited Christenson patents.

PHOSPHATED AND AMINE-NEUTRALIZED EPOXY RESIN

The factor that accomplishes the improved results of this invention, i.e., the lowered curing temperature and increased durability, is the incorporated phosphated and amine-neutralized epoxy resin.

The epoxy resins used here (see Evans U.S. Pat. No. 2,887,404) are epoxyhydroxy polyether resins. Preferably, they are polyglycidyl ethers of bisphenol as formed, for example, by the reaction of a bisphenol with epichlorohydrin. A representative formula is as follows:

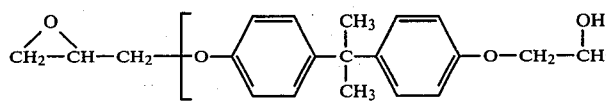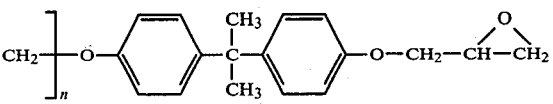

Here n is a number depending on the degree to which etherification is carried out and, for this invention, should be high enough to yield a product either liquid at normal temperatures or having a melting point not above about 100° C. and also having an epoxide equivalent of 185–4000. The Epon ® resins of the Shell Chemical Company numbered between 828 (where n is of a value to give a viscosity at 25° C. of 100–160 poises, epoxide equivalent, 185–192) and 1009, inclusive, i.e., Epon ® 828–1009, are quite satisfactory. Other epoxy resins, however, can be substituted for the Epons ® so long as they possess the physical properties and epoxide equivalents noted.

The epoxy resin used is phosphated by reaction with phosphoric acid, usually as 85% aqueous $H_3PO_4$, at room temperature, in an organic solvent blend. The reaction is an esterification between the hydrogen ions of the phosphoric acid and the epoxy groups of the epoxy resin. In order to prevent gelation and fully esterify all epoxy groups, the order of addition must be epoxy resin to excess phosphoric acid.

The pH of the resulting phosphoric acid-epoxy resin reaction product solution is then brought to a range of 7 to 9 by the addition of an amine, e.g., a lower alkyl or lower alkanol amine. Diethylethanolamine is preferred but other amines such as dibutylamine or triethylamine can be used as well. The amine is simply added directly to the liquid phosphated epoxy resin solution and the pH taken to 7 to 9. Ammonia can be substituted for the amine if desired.

The phosphated and amine-neutralized epoxy resin additive is essential to the lowered curing temperature of the acrylic interpolymer. At the pH range of 7 to 9, storage without gelation or curing and, hence, satisfactory shelf life are obtained. Application of heat to a coating of this material, however, releases phosphoric acid which acts as a curing agent, or catalyst for curing, and results in a curing temperature about 50° F. to 100° F. lower than the curing temperature without the additive. In addition, the additive increases the durability of the acrylic paint or enamel against weather erosion as measured by accelerated weathering and actual Florida 45° south exposure.

The quantity of epoxy resin additive used may vary to some extent. Generally, however, between about 4 to 20%, preferably about 7%, by weight, based on the total weight of the binder constitutents, is employed.

ADDITIONAL MATERIALS

In addition to the acrylic interpolymer and the phosphated epoxy resin, the coating composition will also generally contain an aminoplast resin such as urea-formaldehyde or melamine-formaldehyde resin, benzoguanamine, or hydantoin. The aminoplast resin will comprise about 5–40% by weight of the binder of the paint.

Ethylene polymers of the structure $(CH_2CH_2)_n$, n being a whole number greater than 1, may be used, but some unsaturated groups may be present as well. In any case, a value of n large enough to represent low molecular weight waxy ethylene polymers is most desirable. About 0.5–10% by weight of ethylene polymer on the binder is employed.

Thus, in general, the binder composition of this invention will comprise by weight, based on the weight of solids:

|  | Broad Range % | Preferred Range % |
| --- | --- | --- |
| Methacrylate resin or interpolymer | 35–95 | 79–86 |
| Phosphated and neutralized epoxy resin | 4–20 | 4–10 |
| Aminoplast | 5–40 | 5–15 |
| Polyethylene wax | 0.5–10 | 1–3 |

The sum of these ingredients is, of course, 100% of the binder content of the coating composition.

Conventional flatting agents such as finely-divided silica gel, aluminum silicate, talc, etc., are also preferably employed and may comprise about 0–40 parts/100 parts of binder.

While the present coating compositions are useful colorless or clear, that is, without pigment, pigment is generally desired. Finely ground titanium dioxide is particularly useful, and other pigments and coloring materials may be added. Pigment usually constitutes about 1–120 parts/100 parts of binder, preferably about 20–100 parts/100 parts of binder.

The components noted are generally blended in organic solvents, e.g., aromatic hydrocarbons, alcohols, esters, etc. Water can be used if the acid content of the interpolymer is high enough. Solids content lies between 35 and 85% by weight of the coating composition, preferably about 40–70%.

There follow some examples illustrating the invention. Unless otherwise indicated, temperatures are in degrees fahrenheit, and parts, percentages and ratios are in terms of weight.

EXAMPLE 1—White Acrylic Enamel

A. Preparation of Acrylic Resin

Into a reactor is charged the following mixture:

| Ingredient | Parts by Weight |
| --- | --- |
| Methyl methacrylate | 64.12 |
| Ethyl acrylate | 263.64 |
| Styrene | 64.12 |
| Tertiary-dodecyl mercaptan | 3.23 |
| Acrylic acid | 9.82 |
| Hydrocarbon solvent (b.p. 150–190° C.) | 2.21 |

Acrylamide (25.65 parts) in additional hydrocarbon solvent (123.99 parts) is dropped into the reactor. After the acrylamide is mixed with the charge, butyl alcohol (170.42 parts) is added and the mixture heated to 210° F. and held below 215° F. At that reactor temperature, di-tertiary-butyl peroxide (2.48 parts) and hydrocarbon solvent (7.99 parts) are sequentially added.

The mixture is heated to a reflux temperature of 230° F. in about 10-15 minutes and held there for ½ hour from the beginning of reflux. Over a period of 75 minutes is added tertiary butyl perbenzoate (3.32 parts) in hydrocarbon solvent (19.81 parts). More hydrocarbon solvent (4.85 parts) is added, and reflux is continued for 90 minutes. N-butanol formaldehyde (61.49 parts; butyl Formcel) and hydrocarbon solvent (4.58 parts) are sequentially added and the mixture is refluxed at 230°-240° F. for one hour. Solvent is then slowly distilled from the mixture.

There is recovered a total of 821 parts of the acrylic resin styrene/methyl methacrylate/ethyl acrylate/acrylic acid/acrylamide/n-butanol formaldehyde in the weight ratio 14.29/14.29/58.76/2.19/5.72/4.75 (theoretical: 826.45 parts). Viscosity: Y-Z1 (Gardner-Holdt); Acid number: 14-18; Solids content: 54-56%.

B. Preparation of Phosphated and Amine-Neutralized Epoxy Resin

85% phosphoric acid (188.68 parts) is thoroughly mixed in a reactor for 5 minutes with anhydrous isopropanol (8.68 parts), methyl ethyl ketone (32.71 parts), butyl alcohol (18.40 parts) and ethylene glycol monoethyl ether (Cellosolve ®; 18.04 parts), causing a slight exotherm. To the reactor over a period of 1 to 2 hours is added the epoxy resin Epon ® 828 (444.28 parts) in anhydrous isopropanol (26.05 parts), methyl ethyl ketone (98.15 parts), butyl alcohol (125.20 parts), and ethylene glycol monoethyl ether (54.12 parts), the temperature not being allowed to exceed 194° F.

The mixture is held for ten minutes and cooled to 158° F. It is neutralized with diethylethanolamine (82.05 parts) and the pH is adjusted to 7.0-9.0 with up to a further 25.64 parts of diethylethanolamine if necessary.

C. Preparation of White Mill Base

Acrylic resin prepared in 1A above (19.35 parts) is mixed for 20 minutes with aromatic hydrocarbon (b.p. 182°-219° C.; 15.49 parts) and diacetone alcohol (3.86 parts). Finely divided titanium dioxide pigment (49.00 parts) and low micron and micronized talc (6.15 parts of each) are added and mixed for an additional 20 minutes.

At 110°-130° F., the mixture is passed through a conventional sand mill with 70 lbs. of sand and ground at 26 gallons per minute in an 8-gallon unit to form a white pigment dispersion.

D. Preparation of Polyethylene Dispersion

Acrylic resin prepared as in 1A above (32.80 parts) and polyethylene wax (11.90 parts) are mixed with butanol (124.20 parts) and xylol (19.90 parts) and are mixed together and ground 12,000 cycles in a pebble mill, the temperature being maintained at less than 105° F. The ground dispersion is transferred to a storage tank with additional rinse and xylol (8.00 parts) and hydrocarbon solvent (b.p. 150°-180° C.; 3.00 parts) are added.

E. Preparation of Enamel

| | Parts by Weight |
|---|---|
| Portion 1 | |
| Acrylic Resin Prepared as in 1A above | 124.7 |
| Cellosolve ® Acetate | 4.53 |
| Hydrocarbon Solvent b.p., 182-219° C. | 4.92 |
| Ethylene Glycol Monobutyl Ether (Butyl Cellosolve ®) | 23.30 |
| Methyl Isobutyl Ketone | 21.51 |
| Portion 2 | |
| Acrylic Resin Prepared as in 1A above | 123.07 |
| Polyethylene Dispersion Prepared as above | 64.09 |
| Hexamethoxymethylmelamine (Cymel ® 303) | 25.14 |
| Phosphated Epoxy Resin Prepared as in 1B above | 25.14 |
| Portion 3 | |
| Methyl Isobutyl Ketone | 31.42 |
| Hydrocarbon Solvent - Naphtha B.P., 150-190° C. | 31.42 |
| Brown Iron Titanate* | 2.93 |
| Monastral ® Blue Lake* (Phthalocyanine Blue) | 0.110 |
| Monastral ® Red B* (Quinacridone Red) | Trace |
| Peptized Carbon Black* | 0.45 |
| Titanium Yellow* | 0.41 |

*Trace shading pigments made up similarly to pigment dispersion in 1C.

The ingredients of Portion 1 are added together in a mixer and mixed for 15 minutes. Silica gel flatting agent (Syloid ® 74; 34.69 parts) is added slowly and mixing is continued for 3 hours. White mill base prepared as above (526.12 parts) is added and mixed until uniform. Portion 2 is added during the mixing and mixing continued for 30 minutes, during which time Portion 3 is added. The product is a white coating composition or enamel, solids content 58.44%; weight 10.44 lbs./gal.

F. Coil Coating

Enamel prepared as above can be used for coil coating. For this purpose, it is charged into a conventional coil-coating machine. Strip aluminum is run through the machine and through a conventional zoned baking oven at a speed of 200-400 ft./min. A peak metal temperature of 400°-435° F. is found sufficient for curing and this is obtained at zone temperatures of about 550°-600°-650°-600° F.

In the same system and with essentially the same enamel lacking the phosphated and amine-neutralized epoxy resin, the peak metal temperature is about 435°-465° F. and the zone temperatures are about 600°-650°-700°-650° F.

EXAMPLE 2

A methacrylate interpolymer is made as follows:

| | Parts by Weight |
|---|---|
| Portion 1 | |
| Methyl methacrylate | 63.27 |
| Acrylamide | 25.31 |
| Butyl Acrylate | 215.91 |
| Acrylonitrile | 44.22 |
| Portion 2 | |
| Styrene | 63.27 |
| Tertiary-dodecyl Mercaptan | 3.19 |
| Acrylic acid | 9.69 |
| Hydrocarbon Solvent | 3.17 |

| | Parts by Weight |
|---|---|
| b.p., 150-190° C. | |

Portion 1 is made up in a kettle by addition of the ingredients in the order given and mixed without heating. Portion 2 is mixed in a reactor equipped with reflux condenser and Portion 1 is added. Hydrocarbon (b.p. 150°-190° C., 122.34 parts) and butyl alcohol (168.150 parts) are used to wash out the kettle in which Portion 1 was formed and likewise dropped into Portion 2.

Di-tertiary-butyl peroxide (2.45 parts) and hydrocarbon (b.p. 150°-190° C.; 1.96 parts) are added in order to the reactor, causing an exotherm. Reflux temperature (230° F.) is reached in 10-15 minutes and held for a total of 30 minutes. Tertiary-butyl perbenzoate (3.28 parts) in hydrocarbon (b.p. 150°-190° C.; 19.55 parts) is added evenly over 75 minutes and additional hydrocarbon (4.52 parts) is used to wash out the lines into the reactor; and n-butanol formaldehyde (60.67 parts; butyl Formcel) and additional hydrocarbon (4.51 parts) are separately added. The mixture is heated to reflux (230°-240° F.). After one hour solvent is collected and returned to the reaction. After 2 hours distillation is stopped and the resin removed from the reactor.

The product is the resin styrene/methyl methacrylate/butyl acrylate/acrylonitrile/acrylic acid/acrylamide n-butanol formaldehyde in the ratio 14.29/14.29/48.77/9.99/2.15/5.72/4.75.

Yield: 810.00 parts. Theoretical: 815.46.

When this acrylate resin is made up into a titanium dioxide-containing paint with 4-20% of phosphated and amine-neutralized epoxy resin similar to a commercial paint lacking the epoxy resin and employed in coil coating as in Example 1, similar results are obtained, i.e., a lowering of curing temperatures.

EXAMPLE 3

A methacrylate interpolymer containing enough acid to be water-compatible is made up as follows:

| Ingredient | Parts by Weight |
|---|---|
| Methyl methacrylate | 132.85 |
| Ethyl acrylate | 235.77 |
| N-isobutoxymethylacrylamide* | 58.79 |
| Acrylic acid | 37.20 |
| Ethylene glycol monobutyl ether (butyl Cellosolve ®) | 73.80 |

*The isobutyl ether of N-methylacrylamide, commercially available

To the above mixture is added tertiary dodecyl mercaptan (3.24 parts) and butyl Cellosolve ® (24.26 parts), the mixture is agitated for 10 minutes, and tertiary butyl perbenzoate (5.84 parts) and butyl Cellosolve ® (0.800 parts) are added thereto. Into a reactor containing butyl alcohol (180.57 parts) heated to reflux is fed the mixture over a period of three hours, the temperature rising to 255° F. during the feed. Small additions of butyl Cellosolve ® (16.21 parts) are made, reflux is held for two hours and the heat is shut off. Diethyl ethanol-amine (59.67 parts) to neutralize resin and solubilize in water, and butyl alcohol (5.0 parts) are added to the mixture. The mixture is agitated for 30 minutes, cooled to 150° F., and drawn off through filters. The product is the acrylic interpolymer methyl methacrylate/ethyl acrylate/isobutoxymethylacrylamide/acrylic acid in the ratio 28.6/50.74/8/12.22.

This methacrylate interpolymer also gives a lowered coil coating temperature when mixed with the phosphated and amine-neutralized epoxy resin of Example 1 and employed as in that example, in comparison with a similar commercial paint.

EXAMPLE 4

Another water-soluble acrylic resin is prepared as follows:

| Ingredient | Parts by Weight |
|---|---|
| Methyl methacrylate | 45.2 |
| Butyl acrylate | 237.6 |
| Ethylene glycol monobutyl ether (butyl Cellosolve ®) | 43.10 |
| Butyl alcohol | 19.00 |
| Styrene - rubber grade | 45.20 |
| Demineralized water | 7.50 |
| Acrylic acid | 42.80 |
| Acrylamide | 26.00 |
| 2-mercaptoethanol | 4.20 |
| Acrylonitrile | 32.8 |

The mixture is heated to reflux (106°-108° C.), ditertiarybutyl peroxide (2.0 parts) in butyl Cellosolve ® (0.5 part) is added, and reflux is continued for 15 minutes. Tertiary-butyl perbenzoate (2.0 parts) and 2-mercaptoethanol (4.9 parts) in butyl Cellosolve ® (8.0 and 5.1 parts) are separately added and reflux continued for an additional 100 minutes.

Diethylethanolamine (51.2 parts) and butyl Cellosolve ® (0.5 part) are added and the mixture cooled to 100° C. N-butanol formaldehyde (butyl Formcel; 27.5 parts) is added and the mixture maintained at 100° C. for 30 minutes. Deionized water (285.00 parts) is added and the mixture is agitated for 30 minutes and filtered.

The product is an aqueous dispersion of the acrylic interpolymer methyl methacrylate/butyl acrylate/acrylonitrile/styrene/acrylic acid/acrylamide/n-butanol formaldehyde in the weight ratio 9.9/51/7.2/9.9/9.4/5.7/6.

Yield: 880 parts. Theoretical: 890 parts.

Similar results in coil coating, i.e., lowered curing temperatures, are obtained when this resin is mixed with the phosphated epoxy resin of Example 1 in a white titanium dioxide enamel and compared with an enamel lacking the phosphated epoxy resin.

EXAMPLE 5

Weathering Tests

A control low-gloss brown paint was prepared in which the film-forming constituents comprised on a Solids basis, (1) the methacrylate interpolymer of Example 1 (92 parts); (2) epoxy resin (Epon ® 1001; 5 parts; Epon ® 1001 is the epoxy resin of the formula above where n is of a value to give a solid melting at 65°-75°, Gardner-Holdt viscosity D-G, epoxide equivalent 450-550); and (3) polyethylene wax (3 parts). These; constituents were suspended in an organic solvent blend as in Example 1 E along with a flatting agent (talc and silica gel; 37 parts) and a pigment mixture (19 parts) comprising proportions of precipitated red iron oxide, peptized carbon black, brown titanate pigment and titanium dioxide to provide the color and low gloss.

A paint of the invention of substantially the color and gloss of the above was made up in a preferred experimental formulation consisting essentially of the same materials in substantially the same proportions as in the control paint except that the film-forming ingredients comprised (1) the methacrylate interpolymer of Example 2 (80–84 parts); (2) hexamethoxymethylmelamine (Cymel® 303; 10–8 parts); (3) phosphated and amine-neutralized epoxy resin of Example 1 B (7–5 parts); and (4) polyethylene wax (3 parts).

Aluminum panels were coated with both the control paint and the paint of this invention. These panels were subjected to accelerated weathering tests and tests in the Florida sun. Results are as shown as follows:

| | | GLOSS/COLOR RETENTION | | | |
|---|---|---|---|---|---|
| Exposure Time | Exposure Time | 60° Gloss Change | | DE Color Change NBS Units | |
| | | Control | Exper. | Control | Exper. |
| | 0 Hrs. | 10.5 | 10 | | |
| AWC X-1* | 250 Hrs. | 10 | 11 | 1.6 | 0.4 |
| | 500 Hrs. | 8 | 10 | 4.0 | 0.5 |
| | 1000 Hrs. | 5 | 9 | 7.1 | 2.9 |
| | 2000 Hrs. | 1 | 2 | 12.2 | 9.4 |
| | 3000 Hrs. | 1 | 2 | 14.6 | 12.4 |
| FLA 45° S.** | 12 Mos. | 9 | 11 | 3.2 | 0.9 |
| | 24 Mos. | 5.5 | 10 | 6.0 | 1.2 |

*Accelerated Weathering Unit; Preferred Method A, U.S. Pat. No. 3,501,942.
**According to ASTM D1014.

The experimental paint is thus obviously better under weathering conditions than paint without phos-phated and neutralized epoxy resin.

What is claimed is:

1. A coating composition comprising 35–95% by weight of a methacrylate interpolymer, said interpolymer consisting essentially of 5–40% by weight of methyl methacrylate, 5–26% of at least one functionally substituted (meth)acrylic monomer carrying carboxy, amido, N-hydroxymethylamido, N-alkoxymethylamido hydroxy or oxirane functional groups, and at least one other monomer having a $CH_2=C<$ group, and about 4–20% by weight of a fully phosphated and amine- or ammonia-neutralized epoxyhydroxy polyether resin.

2. A coating composition of claim 1 wherein the methacrylate interpolymer is formed from stryrene/-methyl methacrylate/ethyl acrylate/acrylic acid/acrylamide/n-butanol formaldehyde.

3. A coating composition of claim 1 wherein the methacrylate interpolymer is formed from styrene/-methyl methacrylate/butyl acrylate/acrylonitrile/acrylic acid/acrylamide/n-butanol formaldehyde.

4. A coating composition of claim 1 wherein the methacrylate interpolymer is formed from methyl methacrylate/ethyl acrylate/isobutoxymethylacrylamide/acrylic acid.

5. A coating composition of claim 1 comprising 5–40% by weight of an aminoplast.

6. A coating composition of claim 5 wherein the methacrylate interpolymer is formed from styrene/-methyl methacrylate/ethyl acrylate/acrylic acid/acrylamide/n-butanol formaldehyde.

7. A coating composition of claim 5 wherein the methacrylate interpolymer is formed from styrene/-methyl methacrylate/butyl acrylate/acrylonitrile/acrylic acid/acrylamide/n-butanol formaldehyde.

8. A coating composition of claim 5 wherein the methacrylate interpolymer is formed from methyl methacrylate/ethyl acrylate/isobutoxymethylacrylamide/acrylic acid.

9. A coating composition of claim 1 in liquid suspension or solution comprising about 35–85% by weight of solids.

10. A liquid coating composition of claim 9 wherein the solids comprise, by weight, about 5–40% of an aminoplast.

11. A liquid coating composition of claim 9 wherein the solids comprise, by weight, about 0.5–10% of polyethylene wax.

12. A liquid coating composition of claim 9 wherein the solids comprise, by weight, about 4–30% of a flatting agent.

13. A liquid coating composition of claim 9 wherein the solids comprise, by weight, about 1–60% of pigment.

14. A liquid coating composition of claim 9 wherein the solvent is organic.

15. A liquid coating composition of claim 14 wherein the solvent contains water.

* * * * *